United States Patent
Mu et al.

(10) Patent No.: US 12,405,116 B2
(45) Date of Patent: Sep. 2, 2025

(54) NAVIGATION SYSTEM WITH AUTOMATIC OPTICAL CALIBRATION MECHANISM AND METHOD OF OPERATION THEREOF

(71) Applicant: TeleNav, Inc., Santa Clara, CA (US)

(72) Inventors: Mengchao Mu, Shanghai (CN); Congmin Bai, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 247 days.

(21) Appl. No.: 18/117,273

(22) Filed: Mar. 3, 2023

(65) Prior Publication Data

US 2024/0295402 A1   Sep. 5, 2024

(51) Int. Cl.
| | |
|---|---|
| *G06T 7/80* | (2017.01) |
| *G01C 21/30* | (2006.01) |
| *G06T 7/70* | (2017.01) |
| *H04N 17/00* | (2006.01) |
| *H04N 23/90* | (2023.01) |

(52) U.S. Cl.
CPC ............. *G01C 21/30* (2013.01); *G06T 7/80* (2017.01); *H04N 17/002* (2013.01); *H04N 23/90* (2023.01); *G06T 2207/20212* (2013.01); *G06T 2207/30168* (2013.01); *G06T 2207/30256* (2013.01)

(58) Field of Classification Search
CPC .......... H04N 17/002; G06T 7/70; G06T 7/80; G06T 2007/20212; G06T 2007/30168; G06T 2007/30256
See application file for complete search history.

(56) References Cited

U.S. PATENT DOCUMENTS

| | | | |
|---|---|---|---|
| 6,771,276 B1 * | 8/2004 | Highsmith | G06T 15/20 345/619 |
| 9,536,306 B2 * | 1/2017 | Natroshvili | G06T 7/80 |
| 9,883,145 B2 * | 1/2018 | Kawai | G06V 20/588 |
| 10,529,091 B2 * | 1/2020 | Kim | G06T 7/536 |
| 10,558,867 B2 * | 2/2020 | Ohara | B60R 21/00 |
| 10,902,641 B2 * | 1/2021 | Hafner | G06T 7/80 |
| 11,113,843 B2 * | 9/2021 | Dworakowski | G06T 7/80 |
| 11,205,284 B2 * | 12/2021 | Dai | G06T 7/80 |

(Continued)

FOREIGN PATENT DOCUMENTS

CN   113870367 B   2/2022

OTHER PUBLICATIONS

Kyoungtaek Choi, Ho Gi Jung, and Jae Kyu Suhr; "Automatic Calibration of an Around View Monitor System Exploiting Lane Markings"; Published by MDPI; pp. 1 to 26; Sensors 2018; 18, 2956; doi: 10.3390/s18092956; www.mdpi.com/journal/sensors.

(Continued)

*Primary Examiner* — Brian P Yenke
(74) *Attorney, Agent, or Firm* — Perspectives Law Group, Corp.

(57) ABSTRACT

A navigation system includes: a control circuit configured to: a control circuit configured to: capture a sensor data stream provided by optical sensors, extract lane lines from the sensor data stream, optimize an extrinsic parameter and an intrinsic parameter based on the extract of the lane lines, and compile optimized parameters including the extrinsic parameter and the intrinsic parameter; and a communication circuit, coupled to the control circuit, configured to receive an optical sensor alert for displaying on a device.

20 Claims, 7 Drawing Sheets

(56) References Cited

U.S. PATENT DOCUMENTS

| | | | |
|---|---|---|---|
| 11,393,126 B2* | 7/2022 | Markkassery | H04N 23/54 |
| 11,587,332 B2* | 2/2023 | Zhou | G06V 10/457 |
| 11,645,783 B2* | 5/2023 | Sakano | G06T 7/80 |
| | | | 348/148 |
| 11,867,514 B2* | 1/2024 | Mu | G01C 21/3667 |
| 12,200,186 B2* | 1/2025 | Bai | H04N 23/90 |
| 2002/0186217 A1* | 12/2002 | Kamata | G06T 15/10 |
| | | | 345/427 |
| 2005/0179688 A1* | 8/2005 | Chernichenko | G06T 5/80 |
| | | | 345/427 |
| 2006/0291744 A1* | 12/2006 | Ikeda | G06T 3/00 |
| | | | 382/293 |
| 2009/0122058 A1* | 5/2009 | Tschesnok | G06T 7/579 |
| | | | 345/420 |
| 2010/0053569 A1* | 3/2010 | Furui | H04N 9/3185 |
| | | | 353/121 |
| 2010/0295948 A1* | 11/2010 | Xie | G06T 7/80 |
| | | | 348/E17.002 |
| 2012/0269388 A1* | 10/2012 | Jiang | G06T 7/75 |
| | | | 382/103 |
| 2015/0117787 A1* | 4/2015 | Chaudhury | G06T 7/80 |
| | | | 382/199 |
| 2015/0161456 A1* | 6/2015 | Chevalley | H04N 23/683 |
| | | | 348/148 |
| 2015/0222813 A1* | 8/2015 | Okude | G01C 21/3602 |
| | | | 701/523 |
| 2015/0329048 A1 | 11/2015 | Wang et al. | |
| 2018/0292201 A1* | 10/2018 | Sakano | G06T 7/80 |
| 2018/0365857 A1* | 12/2018 | Lee | G06T 7/536 |
| 2018/0365858 A1 | 12/2018 | Kim et al. | |
| 2019/0102910 A1* | 4/2019 | Kaneko | G06T 7/13 |
| 2019/0197693 A1* | 6/2019 | Zagaynov | G06V 30/412 |
| 2019/0258251 A1 | 8/2019 | Ditty et al. | |
| 2020/0134871 A1* | 4/2020 | Hayakawa | G06T 7/80 |
| 2020/0357138 A1* | 11/2020 | Xiang | H04N 23/54 |
| 2021/0082086 A1* | 3/2021 | Bichu | G06T 5/80 |
| 2021/0241005 A1 | 8/2021 | Abbott et al. | |
| 2021/0279845 A1 | 9/2021 | Feng et al. | |
| 2021/0312203 A1 | 10/2021 | Patzwaldt | |
| 2022/0350992 A1* | 11/2022 | Ghazi Mansour | G06V 10/82 |
| 2023/0115501 A1* | 4/2023 | Mu | G06T 7/60 |
| | | | 701/431 |
| 2024/0295403 A1* | 9/2024 | Long | G01C 21/3807 |
| 2024/0295413 A1* | 9/2024 | Zheng | G01C 21/3815 |
| 2024/0355067 A1* | 10/2024 | Ahmed | G06T 7/50 |

OTHER PUBLICATIONS

Varun Ravi Kumar, Ciaran Eising, Christian Witt, and Senthil Yogamani; "Surround-View Fisheye Camera Perception for Automated Driving: Overview, Survey & Challenges"; pp. 1 to 21; arXiv:2205.13281v1 [cs. CV] May 26, 2022.

* cited by examiner

NAVIGATION SYSTEM WITH AUTOMATIC OPTICAL CALIBRATION MECHANISM AND METHOD OF OPERATION THEREOF

TECHNICAL FIELD

An embodiment of the present invention relates generally to a navigation system, and more particularly to a system with an automatic optical calibration system.

BACKGROUND ART

As autonomous vehicles emerge on the scene, they require detailed high definition maps that can display every aspect of a roadway along a route and an optical network that can verify features listed in the high definition maps. The optical network can consist of multiple cameras that observe all sides of the environment around the autonomous vehicle. The combination of the optical network and a high definition map are required for safe operation of the autonomous vehicle. Over time the condition of the optical network can degrade to the point that it is not advisable to use the vehicle in autonomous mode.

Thus, a need still remains for a navigation system with an automatic optical calibration mechanism to provide monitoring and calibration of the optical network to improve identification of roadway features for autonomous vehicles. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including capturing a sensor data stream provided by optical sensors: extracting lane lines from the sensor data stream: optimizing an intrinsic parameter and an extrinsic parameter based on the extract of the lane lines: compiling optimized parameters including the intrinsic parameter and the extrinsic parameter: and receiving an optical sensor alert for displaying on a device.

An embodiment of the present invention provides a navigation system, including a control circuit configured to: a control circuit configured to: capture a sensor data stream provided by optical sensors, extract lane lines from the sensor data stream, optimize an intrinsic parameter and an extrinsic parameter based on the extract of the lane lines, and compile optimized parameters including the intrinsic parameter and the extrinsic parameter: and a communication circuit, coupled to the control circuit, configured to receive an optical sensor alert through the network for displaying on a device.

An embodiment of the present invention provides a non-transitory computer readable medium including instructions for a navigation system, including: capturing a sensor data stream provided by optical sensors: extracting lane lines from the sensor data stream: optimizing an intrinsic parameter and an extrinsic parameter based on the extract of the lane lines: compiling optimized parameters including the intrinsic parameter and the extrinsic parameter: and receiving an optical sensor alert for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
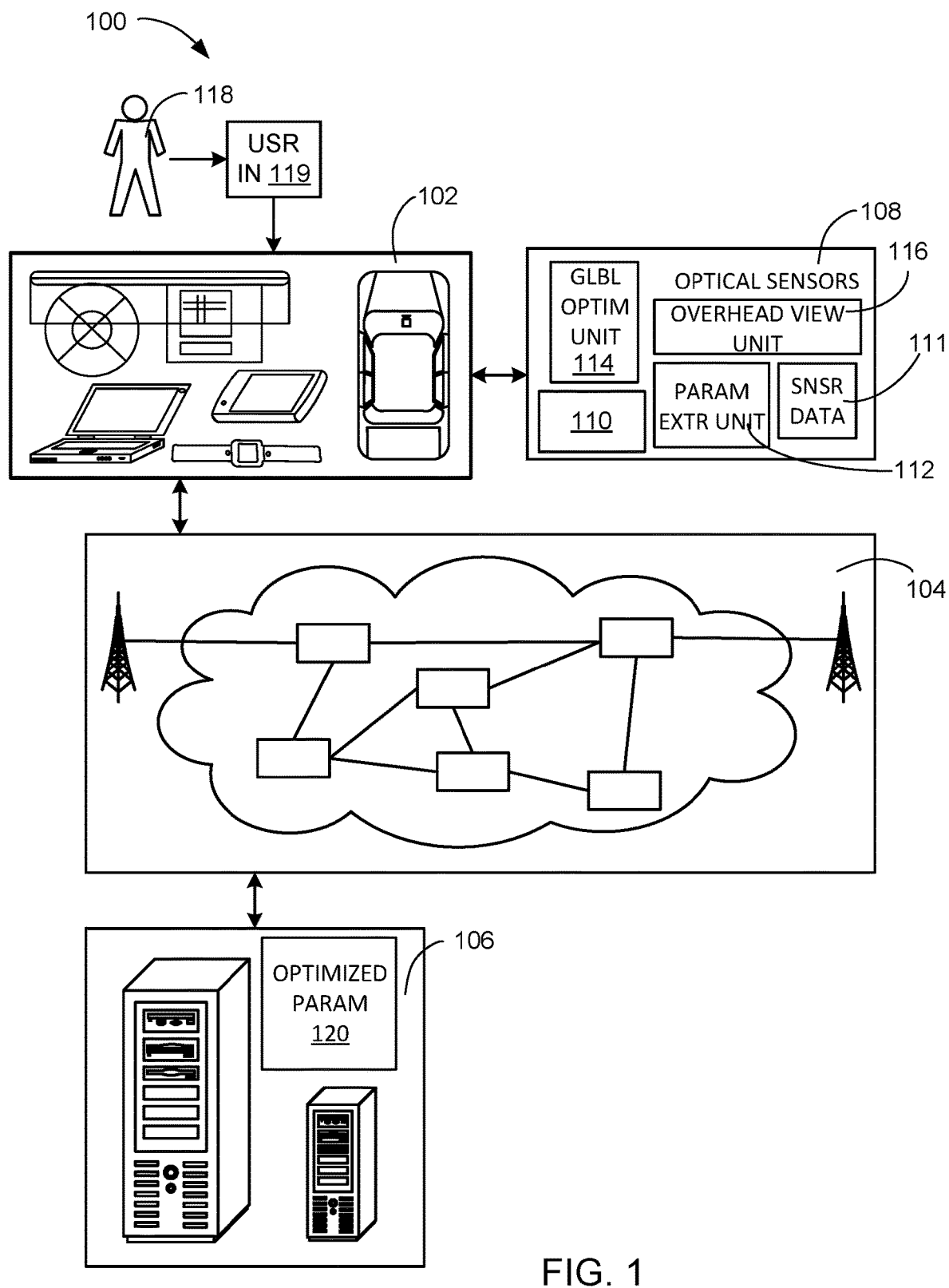
FIG. 1 is a block diagram of a navigation system with an automatic optical calibration mechanism in an embodiment of the present invention.

The features described, on an individual basis, can be executed in combination without altering the claimed invention. The description of the individual features is for clarity and understanding of the depth and breadth of the claimed invention, without limitation on the combination of those features. The execution of any combination of the features is possible.

An optical network can consist of four cameras with fisheye lenses that are strategically placed to observe all sides of an autonomous vehicle. The functioning of these cameras is imperative to the safe operation of the autonomous vehicles. As these vehicles age, the extrinsic and intrinsic parameters can drift away from the original values. The changes could be the result of an oxidized lens, dirt or debris on the lens or housing of the camera, position changes on the body of the vehicle, or a combination of such elements. In order to address the real-time changes in the optical network, an automatic optical calibration mechanism can dynamically tune the extrinsic and intrinsic parameters and alert the user that a parametric deficiency has been detected.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z): where X and Y and Z are three coordinates that define the geographic location, i.e., a position of a vehicle, an artifact, or a pixel in an optical data frame.

The term "module" referred to herein can be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" is written in the system claims section below; the "unit" is deemed to include hardware circuitry for the purposes and the scope of the system claims.

The units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

The term "extrinsic parameter" as used in this description means the pose of the camera being analyzed. The pose of the camera defines the physical relationship between camera and the real world objects the camera is viewing. The variables used to analyze the pose are direction, pitch, and yaw. The term "intrinsic parameter" as used in this description means the physical parameters within the camera including the focal length, lens distortion coefficient, scaling factor, principal point location, and size of the pixels. The combination of the extrinsic parameters and the intrinsic parameters define the physical conversion of the real-world view to the corrected captured image within the camera.

The term "fuse" or "fusing" as used in the specification and the claims have the meaning of combining, concatenating, merging, or integrating as appropriate for the usage of the term. In the case of the optical network, fusing the views of adjacent cameras can identify elements that are displayed in more than one view from adjacent cameras.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a block diagram of a navigation system 100 with an automatic optical calibration mechanism in an embodiment of the present invention. The navigation system 100 can include a first device 102, such as a client or a server, connected to a second device 106, such as a client or server.

The navigation system 100 can include a system for capturing detailed information about a road or thoroughfare based on fusion of multiple sources to reconcile and quickly identify specific details about the roadway surface and signage associated with traffic flow on the roadway. The first device 102 can communicate with the second device 106 through a network 104, such as a wireless or wired network.

For example, the first device 102 can be of any of a variety of computing devices, such as a cellular phone, personal digital assistant, a notebook computer, an autonomous vehicle, automotive telematics navigation system, or other multi-functional device. Also, for example, the first device 102 can include a device or a sub-system, an autonomous or self-maneuvering vehicle or object, a driver assisted vehicle, a remote-controlled vehicle or object, or a combination thereof.

The first device 102 can couple, either directly or indirectly, to the network 104 to communicate with the second device 106 or can be a stand-alone device. The first device 102 can further be separate from or incorporated with a vehicle, such as a car, truck, bus, or motorcycle.

For illustrative purposes, the navigation system 100 is described with the first device 102 as a mobile computing device, although it is understood that the first device 102 can be different types of devices. The first device 102 can be an autonomous vehicle or an accessory device coupled to the telematics vehicle network to support an autonomous vehicle.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as endpoints of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can provide additional features that are not available in prior art navigation systems. The first device 102 can be coupled to optical sensors 108 that include a sensor data local storage 110. The optical sensors 108 are monitoring devices, such as a set of monocular cameras positioned on the first device 102, configured to monitor, observe, record, or a combination thereof the surroundings of the first device 102. The sensor data local storage 110 provides a non-transitory storage medium loaded by a parameter extraction unit 112 to store a sensor data stream 111 captured by the optical sensors 108. The parameter extraction unit 112 can be a hardware structure that provides machine learning and can include four banks of the memory that can be loaded from the sensor data stream 111 of the optical sensors 108 for manipulation of the sensor data stream 111 in order to identify the extrinsic and intrinsic parameters. The parameter extraction unit 112 can include circuitry that analyzes the overlap region from each of the optical sensors 108 to identify items or elements that appear in more than one of the optical sensors 108.

The parameter extraction unit 112 can be coupled to a global re-optimization unit 114, in the sensor data local storage 110, capable of storing fixed size frames from each of the optical sensors 108, such as periodically captured the sensor data stream 111 can be analyzed by the global re-optimization unit 114 in succession. The global re-optimization unit 114 can be a hardware structure that receives the sensor data stream 111. Once processed, the global re-optimization unit 114 can be serially correct the real-world position of lines and features in the sensor data stream 111.

For example, the sensor data local storage 110 can be implemented in a number of ways, such as a non-volatile storage device, such as a hard disk drive, a solid state storage device (SSD), a FLASH memory card, or a combination thereof capable of fusing the sensor data stream 111 from each of the optical sensors 108 into the global re-optimization unit 114.

The parameter extraction unit 112 can provide a pixel evaluation module, that can be implemented in software running of specialized hardware, full hardware, or a combination thereof configured to analyze a photographic scene to identify features and lane lines around the first device 102. The data can include road markings, lane lines, road boundaries, traffic control devices, crosswalks, lane markers, or a combination thereof. The parameter extraction unit 112 can process a sensor data stream 111, including sampled frames of data from each or the optical sensors 108, in order to provide the global re-optimization unit 114 with relative locations of features based on the physical location of the optical sensors 108.

The global re-optimization unit 114 can process the sensor data stream 111 in order to estimate the geographic location of the lines and features in the sensor data stream 111. An overhead view unit 116 can produce a two-dimensional overhead view of a roadway in a region surrounding the first device 102. It is understood that the compilation of the sensor data stream 111 from four of the optical sensors 108 can be displayed by the overhead view unit 116. The overhead view unit 116 is a hardware structure supported by software that can generate a view of the region surrounding the first device 102. The overhead view unit 116 provides a fusing of the sensor data stream 111 from each of the optical sensors 108, including resolving any overlap view of features that are observed in more than one of the optical sensors 108. The overhead view unit 116 can provide position correction of features and elements that are duplicated in more than one of the sensor data stream 111. It will be understood that wide angle lenses of the optical sensor 108 will provide overlap regions that observe the same objects from different angles. The overhead view unit 116 can correct the pose error caused by these overlap regions during the fusing of the sensor data stream 111.

The sensor data local storage 110 can be coupled to or integrated with the optical sensors 108 in order to store a sensor data stream 111 from each of the optical sensors 108 available in the first device 102. The first device 102 can access the parameter extraction unit 112 to determine the relative performance of the optical sensors 108. If the parameter extraction unit 112 determines that the performance of the optical sensors 108 is impaired, a message can be displayed to a user 118.

The navigation system 100 can be operated without the user 118. The user 118 can include a person or an entity accessing or utilizing the navigation system 100 or a device therein. For example, the user 118 can include a person owning or operating the first device 102, a service, or a combination thereof. Also, for example, the user 118 can access or utilize the second device 106 through the first device 102, a service, or a combination thereof.

The navigation system 100 can further process a direct user input 119 from the user 118. The direct user input 119 can include the user 118 taking manual control of the autonomous vehicle or the first device 102. The direct user input 119 can be provided by or from the user 118 directly to or directly on the first device 102.

The direct user input 119 can include an increase in speed, a decrease in speed, a change of position within a lane, stop, start, or changing lanes as prompted or controlled by the user 118. The direct user input 119 can include the user 118 issuing audio commands or physically managing the manual controls within the first device 102.

The second device 106 can receive optimized parameters 120, periodically from the first device 102, to track a population of the optical sensors 108 used in the first device 102. The second device 106 compile the optimized parameters 120 from a population of the first device 102. By performing a trend analysis of the optimized parameters 120, the second device can use an artificial intelligence algorithm to predict when the optical sensors must be serviced before they present a dangerous situation.

The combination of processing provided by the first device 102 and the second device 106 can alert the user 118 that the optical sensors are in need of maintenance. In extreme cases, the second device 106 can alert the first device 102 to have the user take control of the first device, such as an autonomous vehicle.

It is understood that while the embodiment described above requires the processing power of the first device 102 and the second device 106, but it is understood that the full operation of the navigation system 100 can be performed within the first device 102. Other partitions of the invention are possible and would be understood by one having ordinary skill in the art.

It has been discovered that the navigation system 100 can reliably maintain the optimized parameters 120 for the first device 102 without intervention by the user 118. In the autonomous vehicle, maintaining the proper control of the optimized parameters 120 is key to the safe operation and can provide early warning that the optical sensors 108 require attention. The navigation system 100 can improve the reliability of the autonomous vehicle by providing the optimized parameters 120 and the early warning to the user 118 that maintenance is required. The optical sensors 108 of the optical network can be repositioned due to vibration, accident, or manual interference. In other cases, the lens of one or more of the optical sensors 108 can be soiled or blocked by debris. A first device 102 operating in autonomous mode can become a lethal weapon if one or more of the optical sensors 108 in the optical network id damaged or degraded.

Figure 2:
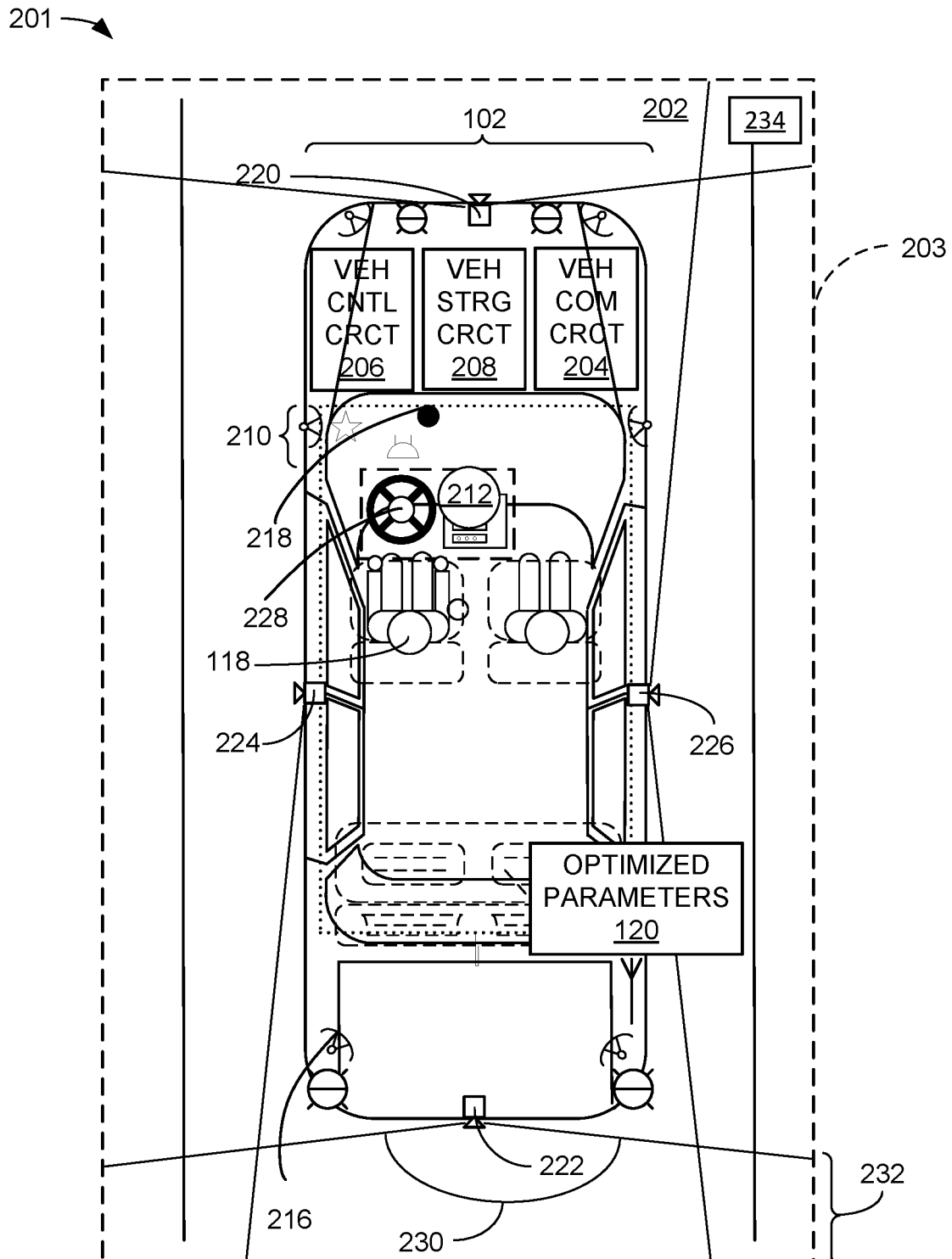
FIG. 2 is an example of a top plan view illustration of a vehicle for the navigation system.

Referring now to FIG. 2, therein is shown an example of a top plan view 201 illustration of a vehicle for the navigation system 100 of FIG. 1. The navigation system 100 can be included in or interact with the first device 102. Since the set-up and calibration of the optical network is performed by a specific process when the autonomous vehicle is first manufactured. The degradation of the optical network must be periodically verified by the manufacturer during scheduled maintenance. The possible degradation of the optical network between scheduled maintenance can present significant dangers to the passengers and the public.

The first device 102 can be an object or a machine used for transporting people or goods capable of automatically maneuvering or operating the object or the machine. The first device 102 can include vehicles accessible by the user 118 of FIG. 1 for control, maneuver, operation, or a combination thereof. For example, the first device 102 can include a car, a truck, a cart, a drone, or a combination thereof.

The first device 102 can further be controlled or maneuvered without the direct user input 119 of FIG. 1 corresponding to the maneuver or the movement. For example, the first device 102 can include a self-driving vehicle, or a vehicle with automatic maneuvering features, such as smart cruise control or preventative breaking. The first device 102 can include a smart cruise control feature, capable of setting and adjusting the travel speed of the first device 102 without the direct user input 119. Also, for example, the first device 102 can be controlled or maneuvered by the navigation system 100, including the navigation system 100 controlling or setting a cruising speed, lane position, or other physical maneuvers or movements of the first device 102.

The navigation system 100 can further utilize the optimized parameters 120 from one or more vehicles or devices. The optimized parameters 120 can provide important reliability information and adjustments for a front optical sensor 220, a rear optical sensor 222, a left optical sensor 224, and a right optical sensor 226. Each of the front optical sensor 220, the rear optical sensor 222, the left optical sensor 224, and the right optical sensor 226 can be a hardware camera including a fisheye lens having a 170 degree view of a region of interest 203

The first device 102 or other vehicles interfacing with the navigation system 100 can include a device, a circuit, one or more specific sensors, such as environmental sensors 210. or a combination thereof for providing assistance or additional information to the user 118 controlling, maneuvering, or operating the first device 102. The environmental sensors 210 can include a cabin camera, LiDAR sensors, the optical sensors 108, or a combination thereof. The optical sensors 108 can be camera with a wide-angle lens, such as a fisheye lens. The optical sensors 108 can be mounted on the exterior of the first device 102 positioned at the front, rear, left side, and right side of the first device 102. The first device 102 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding first device 102 and configured to store and recall information. The vehicle storage circuit 208 can be a volatile memory, a nonvolatile memory, an internal memory, an external memory, or a combination thereof and can include the sensor local storage 110 of FIG. 1. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the navigation system 100 or vehicle manufacturer, or a combination thereof. The vehicle storage circuit 208 can periodically load the optimized parameters 120 from the second device 106 of FIG. 1 for the optical sensors 108.

The vehicle control circuit 206 can include a functional unit or circuit integral to the first device 102 and configured as a processor to execute or implement instructions. The vehicle control circuit 206 can execute or implement the vehicle software to provide the intelligence of the corresponding vehicle, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a functional unit or circuit integral to the corresponding vehicle, such as the first device 102, another vehicle, or a combination thereof. The vehicle communication circuit 204 can be configured to enable external communication to and from the corresponding vehicle. For example, the vehicle communication circuit 204 can permit the first device 102 to communicate with the second device 106 through the network 104 of FIG. 1.

The vehicle communication circuit 204 can also function as a communication hub allowing the corresponding control vehicle to function as part of the network 104 and not limited to be an end point or terminal circuit to the network 104. The vehicle communication circuit 204 can include active and passive components, such as microelectronics, circuitry, or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the second device 106 as end points of the communication, such as for direct line-of-sight communication or peer-to-peer communication. The vehicle communication circuit 204 can further couple with the network 104 to send or receive information through a server or another intermediate device in between endpoints of the communication.

The first device 102 or other vehicles can further include various interfaces. The first device 102 can include one or more interfaces for interaction or internal communication between functional units or circuits of the first device 102. For example, the first device 102 can include one or more interfaces, such as drivers, firmware, wire connections or buses, protocols, or a combination thereof, for the vehicle storage circuit 208, the vehicle control circuit 206, or a combination thereof.

The first device 102 or the other vehicles can further include one or more interfaces for interaction with an occupant, an operator or a passenger, the user 118, or a combination thereof relative to the corresponding vehicle. For example, the first device 102 or the other vehicles can include a user interface 212 including input or output devices or circuits, such as a screen or touch screen, a speaker, a microphone, a keyboard or other input devices, an instrument panel, or a combination thereof.

The first device 102 can further include one or more interfaces along with switches or actuators for physically controlling movable components of the first device 102. For example, the first device 102 can include the one or more interfaces along with the controlling mechanisms to physically perform and control the maneuvering of the first device 102, such as for automatic driving, smart cruise control, or maneuvering features.

The functional units or circuits in the first device 102 can work individually and independently of the other functional units or circuits. The first device 102 can work individually and independently from the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the corresponding vehicle, an environment external to and surrounding the corresponding vehicle, or a combination thereof. The environmental sensors 210 can be implement for the first device 102.

For example, the environmental sensors 210 can include a user interface 212, the optical sensor 108, a radar sensor 216, a location-movement sensor 218, or a combination thereof. The user interface 212 can include a projector, a video screen, a touch screen, a speaker, or any combination thereof. The user interface 212 can display the optimized parameters 120 of FIG. 1, a planned route, lane suggestions, speed warnings, vehicle system alerts and combinations thereof.

The optical sensor 108 can include a sensor for detecting or determining visual information representing the environment external to and surrounding of the corresponding vehicle. The optical sensor 108 can include a camera attached to or integral with the corresponding vehicle or device. For example, the optical sensor 108 can include a camera, such as forward facing camera, a video camera, a rear-view or back-up camera, a side-view or a blind-spot camera, or a combination thereof. Also, for example, the environmental sensors 210 can include an infrared sensor, a night vision video camera, or a night vision sensor.

The optical sensor 108 can further include a camera on the first device 102 or another user device of the user 118 connected to and interacting with a vehicle. The optical sensor 108 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the corresponding device or vehicle, a relative location or a distance between the object or the target and the corresponding device or vehicle, or a combination thereof.

The radar sensor 216 can utilize radio waves to determine or identify an existence of the object or the target, the relative location or a distance relative to the first device 102 or other corresponding device or vehicle, or a combination thereof. For example, the radar sensor 216 can include a proximity sensor or warning system, such as for an area in front of, behind, adjacent to or on a side of, or a combination thereof geographically or physically relative to the first device 102.

The location-movement sensor 218 can be a sensor for identifying or calculating a geographic location of the corresponding vehicle or device, determining a movement or speed of the corresponding vehicle or device, or a combination thereof. The location-movement sensor 218 can include an accelerometer, a speedometer, a Global Positioning System (GPS) receiver or device, a gyroscope or a compass, or a combination thereof. The first device 102 can include the environmental sensors 210 other than or in addition to the location-movement sensor 218. The location-movement sensor 218 can provide a gyroscope rate of change for monitoring turns and a speed from the speedometer.

The navigation system 100 can use one or more of the optical sensors 108 corresponding to one or more devices, one or more vehicles, or a combination thereof to generate the traffic flow state 109 describing or representing information regarding the environment surrounding the corresponding device or vehicle. The sensor data stream 111 of FIG. 1 can be further processed with the vehicle control circuit 206, stored in the vehicle storage circuit 208, communicated to another device or vehicle through the vehicle communication circuit 204, or a combination thereof.

As a more specific example, the vehicle communication circuit 204, the vehicle control circuit 206, the vehicle storage circuit 208, the optical sensors 108, one or more interfaces, or a combination thereof can be included in or make up the first device 102.

The navigation system 100 can provide the vehicle movement control 228 as a suggestion to the user 118 for maneuvering or operating the first device 102. Details regarding the utilization and processing of the global re-optimization unit 114 are discussed below.

The navigation system 100 can process and generate vehicle movement control 228 for controlling or maneuvering the first device 102. The vehicle movement control 228 is an instruction, a signal, a process, a method, a mechanism, or a combination thereof directing or controlling physical movement or travel of the first device 102.

Continuing with the example, the navigation system 100 can use the global re-optimization unit 114 provided from the first device 102 without the user input 119. The navigation system 100 can utilize the global re-optimization unit 114 to provide information, assist maneuvering, control maneuvers, or a combination thereof for other vehicles near the first device 102.

Continuing with the example, the navigation system 100 can communicate the optimized parameters 120 through the second device 106 to other devices or vehicles, or directly communicate to the other devices or vehicles, such as for a peer-to-peer communication system. The navigation system 100 can communicate the optimized parameters 120 for informing other devices or vehicles of the status of the first device 102 itself, about other vehicles detected and identified around the first device 102, or a combination thereof.

As a more specific example, the navigation system 100 can use the optimized parameters 120 to detect weaknesses in the optical sensor 108 that would prevent the safe operation of the vehicle movement control 228, such as for steering, braking, setting or adjusting travel speed, accessary control, or a combination thereof. Details regarding the processing of the vehicle movement control 228 are discussed below.

It is understood that the optical sensors 108 can be positioned at fixed locations around the first device 102. By way of an example, the front optical sensor 220, the rear optical sensor 222, the left side optical sensor 224, and the right optical sensor 226 can monitor the region of interest 203 including the details of the roadway 202. The combination of the sensor data streams 111 of FIG. 1 from each of the front optical sensor 220, the rear optical sensor 222, the left side optical sensor 224, and the right optical sensor 226 can be fused by the overhead view unit 116 of FIG. 1 to form surrounding view of the region of interest 203.

It is understood that due to the characteristics of the wide-angle lenses and the relative position of the optical sensors 108, objects can appear in more than one of the optical data streams 111. By way of an example, a fisheye viewing angle 230 can generate overlap regions 232 at the four corners of the region of interest 203. It is understood that the fisheye viewing angle 230 can be substantially equal to 170 degrees of view. The resulting ones of the overlap region 232 can be resolved by the overhead view unit 116. By way of an example, a traffic control sign 234 can be viewed by both the front optical sensor 220 and the right optical sensor 226. The overhead view unit 116 can resolve the traffic control signal 234 to be a single unit of the traffic control sign 234 adjacent to the roadway 202.

Figure 3:
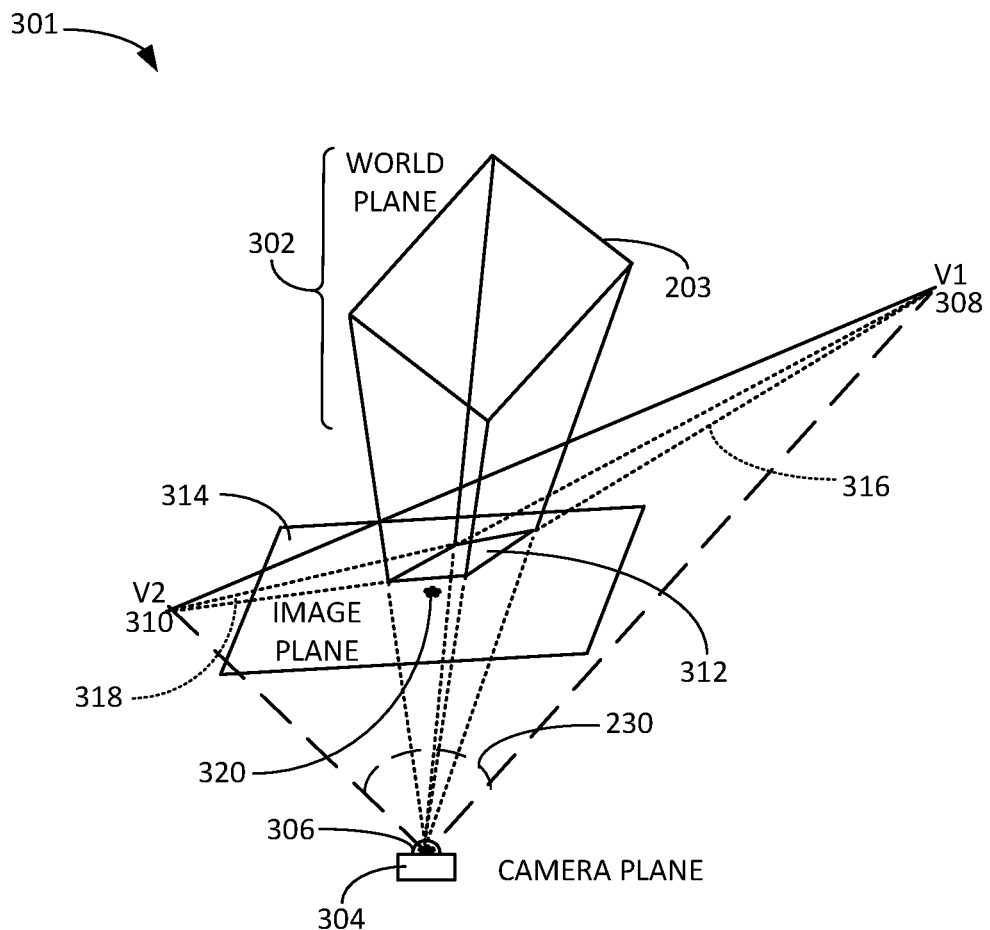
FIG. 3 is an exemplary projection view as processed by the navigation system.

Referring now to FIG. 3, therein is shown an exemplary projection view 301 as processed by the navigation system 100. The region of interest 203 can be represented by a world plane 302 that is the area viewed by a camera 304. The camera 304 can be a high mega-pixel camera having a fisheye lens 306. The fisheye lens 306 can provide a wide-angle view that can provide a first vanishing point 308 and a second vanishing point 310. The geometry of the first vanishing point 308 and the second vanishing point 310 can be indicative of the distortion of the fisheye lens 306.

A projected view 312 of the region of interest 203 can be shown on an image plane 314. The projected image 312 can be identified by extending a first vector 316 from the horizontal dimension of the projected image 312 to the first vanishing point 308 and extending a second vector 318 from the vertical dimension of the projected view 312 to the second vanishing point 310. The resulting view of the projected image 312 can include the distortion coefficient caused by the fisheye lens 306.

A principal point 320 can represent the center and undistorted point in the image plane 314. As the distance from the principal point 320 increases in all directions, the amount of distortion also increases. By assuming a specific relationship between lines extracted from the region of interest 203, the distortion coefficient can be determined. It is understood that most of the intrinsic parameters of the camera 304 are fixed at the time of manufacture. The distortion coefficient can be a variable based on the condition of the fisheye lens 306.

The global re-optimization unit 114 of FIG. 1 can capture the real world location, such as a GPS location, of the first device 102 when the optical data stream 111 is captured. The global re-optimization unit 114 can identify the relative location of features and lines in the optical data stream 111 for the front optical sensor 220 of FIG. 2, the rear optical sensor 222 of FIG. 2, the left optical sensor 224 of FIG. 2, and the right optical sensor 226 of FIG. 2. The overhead view unit 116 can fuse the optical data stream 111 from the front optical sensor 220, the rear optical sensor 222, the left optical sensor 224, and the right optical sensor 226 into an overhead view with the overlap regions 232 of FIG. 2 resolved so that features that appear in more than one of the optical data stream 111 are displayed as a single feature in its actual location.

The characteristic of the fisheye lens 306 of the optical sensors 108 provides greater distortion at greater angles from the perpendicular to the lens of the optical sensors 108. The fisheye viewing angle 230 can provide a large capture area, but it also has increased distortion at the edges. It is understood that fisheye viewing angle 230 can be different for each of the front optical sensor 220, the rear optical sensor 222, the left optical sensor 224, and the right optical sensor 226, but the fisheye viewing angle 230 is constant for each of the optical sensors 108 of FIG. 1.

In order to identify the actual location of the lane lines around the first device 102 in the projection view 301, a calculation of the distance between the lane lines from the front optical sensor 220 and the lane line in the view from the left optical sensor 224. The projection view 301 can be an overhead view showing the relationship between the lane lines and the first device 102. The distance between the lane lines of the front optical sensor 220 and the lane lines from the left optical sensor 224, in the projection view 301, can be measured in pixels. By applying a corrective measure, the lane lines can be shown to be parallel and, in some cases, contiguous.

A similar calculation can be performed between the lane lines of the rear optical sensor 222 and the right optical sensor 226. By adjusting the projected view 301, the lane lines detected by the left optical sensor 224 and the right optical sensor 226 can be shown to be parallel with the lane lines from the front optical sensor 220 and the rear optical sensor 222.

It has been discovered that the parameter extraction unit 112 can learn the correction factors including the correction for the lane lines through training and everyday use. The correction distance, measured in pixels, can be provided to the overhead view unit 116 of FIG. 1 for quick display of the projection view 301.

Figure 4:
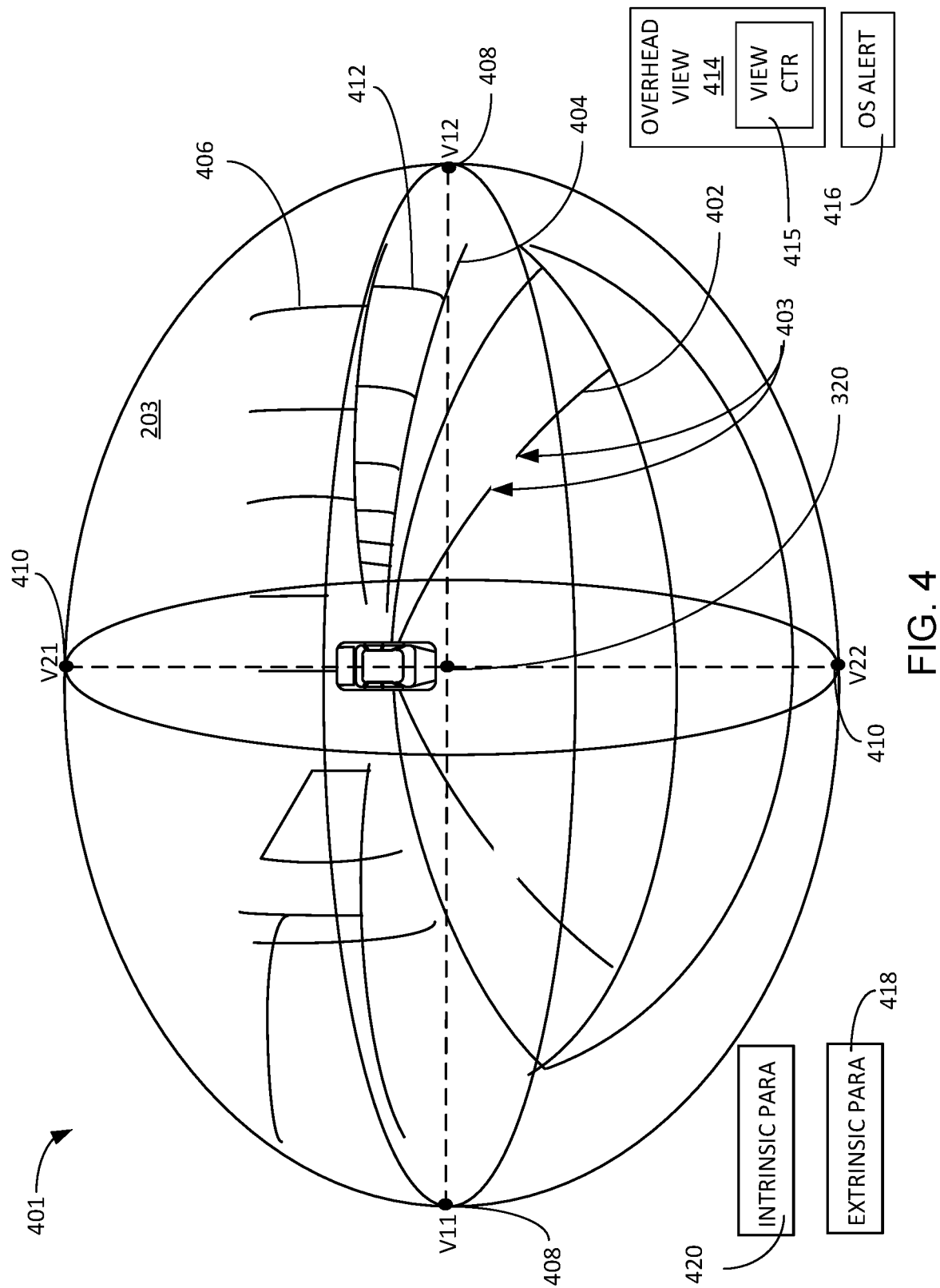
FIG. 4 is shown an exemplary analysis diagram of the navigation system.

Referring now to FIG. 4, therein is shown an exemplary analysis diagram 401 of the navigation system 100 of FIG. 1. The exemplary analysis diagram 401 depicts the region of interest 203 in a line extraction and parametric analysis process. The view of the region of interest 203 can be processed by the parameter extraction unit 112 applying machine learning to extract edge lines from the optical data stream 111 of FIG. 1. The machine learning analysis of the parameter extraction unit 112 can identify a lane line 402, such as a longitudinal line, a horizontal line 404, such as a store front window top and bottom, and vertical lines 406, such as edges of buildings, by observing a series of pixels forming the lines.

It is understood that the optical data stream 111 will show the effects of the distortion coefficient on the lane lines 402, the horizontal lines 404, and the vertical lines 406. The navigation system 100 is aware that the lane lines 402 are in a horizontal plane and parallel to each other. This information allows the determination of the distortion coefficient for the fisheye lens 306 of FIG. 3.

A first set of vanishing points 408 can include the points V11 and V12 in the horizontal direction. A second det of vanishing points 410 can include the points V21 and V22 in the vertical direction. The principal point 320 can be located at the intersection of the lines connecting the first set of vanishing points 408 and the second det of vanishing points 410, As the distance from the principal point 320 increases, lines that are straight in the world plane 302 of FIG. 3 become curved lines due to the distortion of the fisheye lens 306.

The global re-optimization unit 114 of FIG. 1 can identify the relative location of the lines and features captured from the optical data stream 111. The amount of curvature and the distance from the principal point 320 can define a distortion coefficient 412 for the optical data stream 111. The distortion coefficient 412 can be critical to the generation of an overhead view 414 and a view center 415. The view center 415 can be the geolocation of the first device 102. The distortion coefficient 412 can be degraded by dirt or debris on the housing of the optical sensor 108 or oxidation of the fisheye lens 306 of FIG. 3. The navigation system 100 can monitor the distortion coefficient 412 for the front optical sensor 220 of FIG. 2, the rear optical sensor 222 of FIG. 2, the left optical sensor 224 of FIG. 2, and the right optical sensor 226 of FIG. 2 in order to detect any degradation that would require maintenance of the optical sensors 108 or restriction to manual operation of the first device 102 pf FIG. 2.

The global re-optimization unit 114 can calculate the optimized parameters 120 by optimizing extrinsic parameters 418 and intrinsic parameters 420 for each of the front optical sensor 220, the rear optical sensor 222, the left optical sensor 224, and the right optical sensor 226. By way of an example, in computing the extrinsic parameters 418 of the left optical sensor 224 and the right optical sensor 226 and the global re-optimization unit 114 processing can converge the view of the left optical sensor 224 and the rear optical sensor 222. In this example, the calculation of the extrinsic parameters 418 can be performed by analyzing the lane lines 402 in the image from the left optical sensor 224, after converting to the overhead view 414. The first device 102 can calculate the distance between the lane lines 402 in the image of the front optical sensor 220 and the lane lines 402 in the image of the left optical sensor 224 in the overhead view 414. The first device 102 can calculate a distance, in the overhead view 414, between the lane lines 402 of the left optical sensor 224 and the lane lines 402 of the rear optical sensor 222 in the same way. The distance between lane line ends 403 in the overhead view 414 is measured in pixels. The global re-optimization unit 114 can transform the location of the lane line ends 403 to a corrected position with a geolocation in the overhead view 414 based on the geolocation of the view center 415.

It has been discovered that the navigation system 100 can improve the reliability and safety of the first device 102, such as an autonomous vehicle, by monitoring the distortion coefficient 412. The first device 102 can display an optical sensor alert 416 to the user 118 of FIG. 1 to notify the user 118 that maintenance or manual operation is required. The navigation system 100 can prevent accidents that would be caused by degraded operation of the optical sensors 108. Since the degraded operation of the optical sensors 108 can occur at any time, the optical sensor alert 416 can be an essential safety mechanism for the first device 102.

Figure 5:
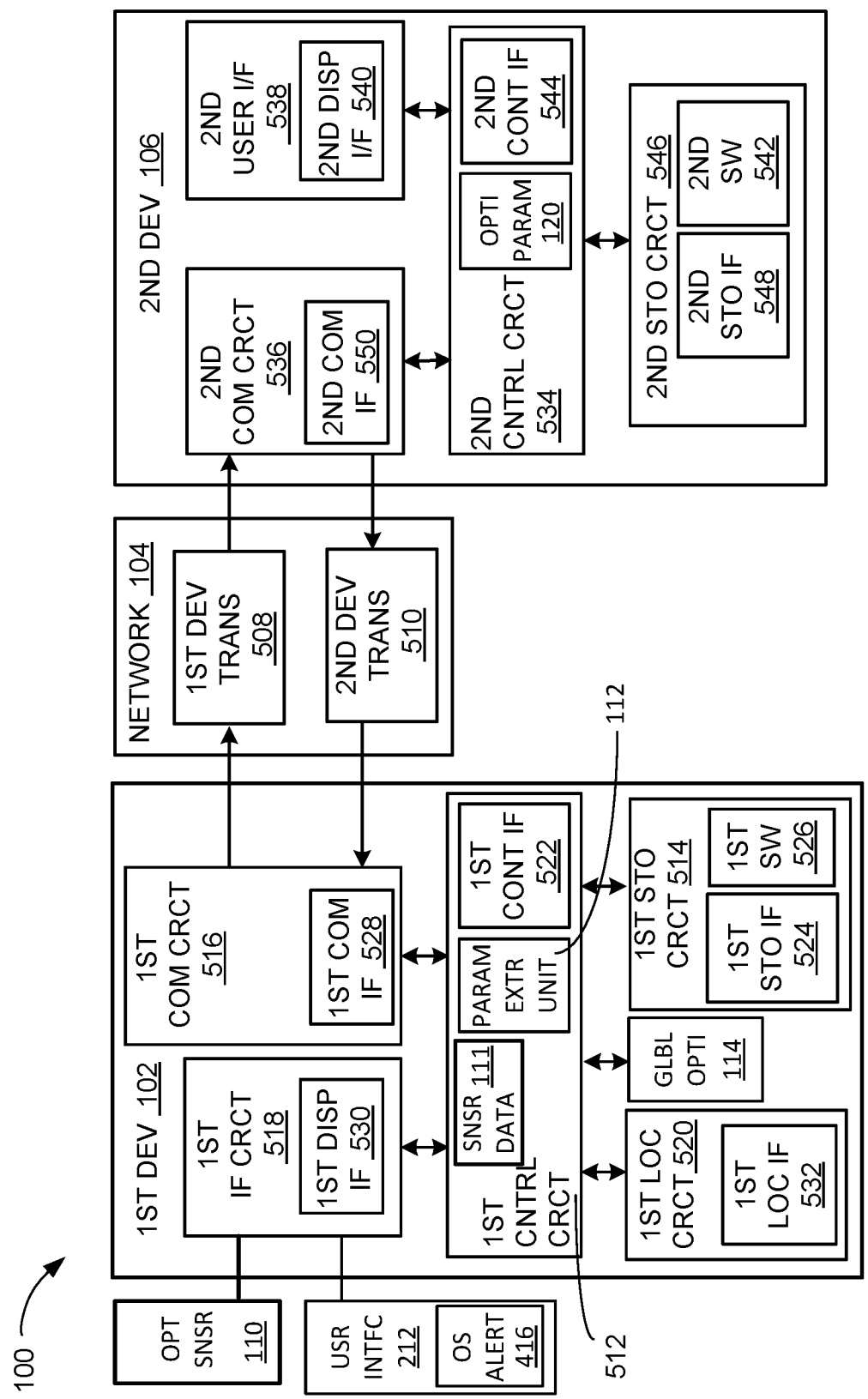
FIG. 5 is an exemplary block diagram of the navigation system in an embodiment.

Referring now to FIG. 5, therein is shown an exemplary block diagram of the navigation system 100 in an embodiment. The navigation system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the navigation system 100 is shown with the first device 102 as a client device, although it is understood that the navigation system 100 can include the first device 102 as a different type of device. For example, the first device 102 can be a server containing the first display interface 530 coupled to the user interface 212.

Also, for illustrative purposes, the navigation system 100 is shown with the second device 106 as a server, although it is understood that the navigation system 100 can include the second device 106 as a different type of device. For example, the second device 106 can be a client device. By way of an example, the navigation system 100 can be implemented entirely on the first device 102. The second device 106 can provide additional computing speed and power.

Also, for illustrative purposes, the navigation system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, analogue circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the sensor data local storage 110 of FIG. 1. The first storage interface 524 can also be used for communication that is external to the first device 102.

The first storage interface 524 can be a hardware circuitry configured to receive information from the other functional units/circuits or from external sources, or can transmit information to the other functional units/circuits or to external destinations. The external sources and the external destinations refer to sources and destinations external to the first device 102. The first storage interface 524 can receive input from and source data to the map data module 115.

The first storage interface 524 can include different implementations depending on which functional units/circuits or external units/circuits are being interfaced with the first storage circuit 514. The first storage interface 524 can be implemented with technologies and techniques similar to the implementation of the first control interface 522, such as analogue circuitry, digital circuitry, wireless circuitry, or wireline circuitry.

The first communication circuit 516 can enable external communication to and from the first device 102. For example, the first communication circuit 516 can permit the first device 102 to communicate with the second device 106 and the network 104.

The first communication circuit 516 can also function as a communication hub allowing the first device 102 to function as part of the network 104 and not limited to be an endpoint or terminal circuit to the network 104. The first communication circuit 516 can include active and passive components, such as microelectronics, analogue circuitry, wireless circuitry, wireline circuitry, or an antenna, for interaction with the network 104.

The first communication circuit 516 can include a first communication interface 528. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522, including a microelectromechanical system (MEMS), optical circuitry, waveguides, wireless circuitry, wireline circuitry, analogue circuitry, or a combination thereof.

The first interface circuit 518 allows the user 118 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, an infrared sensor for receiving remote signals, the optical sensor 108, or any combination thereof to provide data and communication inputs. By way of an example, the optical sensor 108 can connect to the first interface circuit 518 through a wired or wireless connection. The first interface circuit 518 can pass the input from the optical sensor 108 to the first control circuit 512 for processing and storage.

The first interface circuit 518 can include a first display interface 530. The first display interface 530 can include an output device. The first display interface 530 can couple the user interface 212 including a projector, a video screen, a touch screen, a speaker, a microphone, a keyboard, and combinations thereof. The user interface 212 can include the optical sensor alert 416 to notify the user 118 of FIG. 1 that a dangerous condition is in effect and maintenance or manual operation is required.

The first control circuit 512 can operate the first interface circuit 518 to display the optical sensor alert 416 generated by the navigation system 100 and receive input from the user 118. The first control circuit 512 can also execute the first software 526 for the other functions of the navigation system 100, including receiving location information from the first location circuit 520. The first control circuit 512 can further execute the first software 526 for interaction with the network 104 via the first communication circuit 516.

The first control circuit 512 can operate the first interface circuit 518 to collect the sensor data stream 111 from the optical sensors 108. The first control circuit 512 can also receive location information from the first location circuit 520. The first control circuit 512 can operate the parameter extraction unit 112 of FIG. 1 in order to provide the global re-optimization unit 114 with the indicators for the overlap regions 232 of FIG. 2 for further processing.

The first location circuit 520 can be a hardware circuit configured to generate location information used to identify the view center 415 of FIG. 4 in real world coordinates, such as GPS coordinates. The view center 415 can be defined as the geolocation of the first device 102 as determined by the location circuit 520. The first location circuit 520 can be implemented in many ways. For example, the first location circuit 520 can function as at least a part of the global positioning system, an inertial navigation system, a cellular-tower location system, a gyroscope, or any combination thereof. Also, for example, the first location circuit 520 can utilize components such as an accelerometer, gyroscope, or global positioning system (GPS) receiver in order to identify the current location on the Earth by satellite triangulation of cell tower triangulation, including calculating pseudo ranges to the satellites or the cell towers.

The first location circuit 520 can include a first location interface 532. The first location interface 532 can be used for communication between the first location circuit 520 and other functional units or circuits in the first device 102, including the optical sensor 108.

The first location interface 532 can receive information from the other functional units/circuits or from external sources, or can transmit information to the other functional units/circuits or to external destinations. The external sources and the external destinations refer to sources and destinations external to the first device 102, including satellites and cell towers.

The first location interface 532 can include different implementations depending on which functional units/circuits or external units/circuits are being interfaced with the first location circuit 520. The first location interface 532 can be implemented with technologies and techniques similar to the implementation of the first control circuit 512, including analogue circuitry, digital circuitry, wireless circuitry, or wireline circuitry.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540) can include a display, a projector, a video screen, a speaker, or any combination thereof.

The second control circuit 534 can receive the optimized parameters 120 through the second communication circuit 536. The second control circuit 536 can analyze the optimized parameters 120 in order to determine thresholds and distribute warnings regarding the calibration of the optical sensors 108 transmitted by the first device 102.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, analogue circuitry, or a combination thereof.

The second storage circuit 546 can store the second software 542. The second storage circuit 546 can also store the information such as the optimized parameters 120 transferred from the first device 102. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544. The second storage circuit 546 can receive global re-optimization unit 114 as updates from the first device 102.

The second communication circuit 536 can enable external communication to and from the second device 106. For example, the second communication circuit 536 can permit the second device 106 to communicate with the first device 102 over the network 104. By way of an example, the second device 106 can provide thresholds derived from the optimized parameters 120 to the other vehicles that are in or near the region of interest 203 of the first device 102.

The second communication circuit 536 can also function as a communication hub allowing the second device 106 to function as part of the network 104 and not limited to be an endpoint or terminal unit or circuit to the network 104. The second communication circuit 536 can include active and passive circuitry components, such as microelectronics, wireless circuitry, wireline circuitry, analogue circuitry, or an antenna, for interaction with the network 104.

The second communication circuit 536 can include a second communication interface 550. The second communication interface 550) can be used for communication between the second communication circuit 536 and other functional units or circuits in the second device 106. The second communication interface 550) can receive information from the other functional units/circuits or can transmit information to the other functional units or circuits.

The second communication interface 550) can include different implementations depending on which functional units or circuits are being interfaced with the second communication circuit 536. The second communication interface 550) can be implemented with technologies and techniques similar to the implementation of the second control interface 544, including circuitry, waveguides, wireless circuitry, wireline circuitry, analogue circuitry, or a combination thereof.

The second communication circuit 536 can couple with the network 104 to send information to the first device 102, including the optimized parameters 120 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

By way of a further example, the first device 102 can be the autonomous vehicle or the driver assisted vehicle. The first interface circuit 518 can receive input from the optical sensor 108 of FIG. 1, for compiling the global re-optimization unit 114. The global re-optimization unit 114 can be generated by the first control circuit 512 from the optical sensor 108 and the first location circuit 520.

It has been discovered that the second device 106 can receive the optimized parameters 120 from the first device 102 that provides warnings and alerts to vehicles in the area of the region of interest 203. As an example, the second control circuit 534 can verify the optimized parameters 120 and pass the information to the second storage circuit 546 for analysis.

Figure 6:
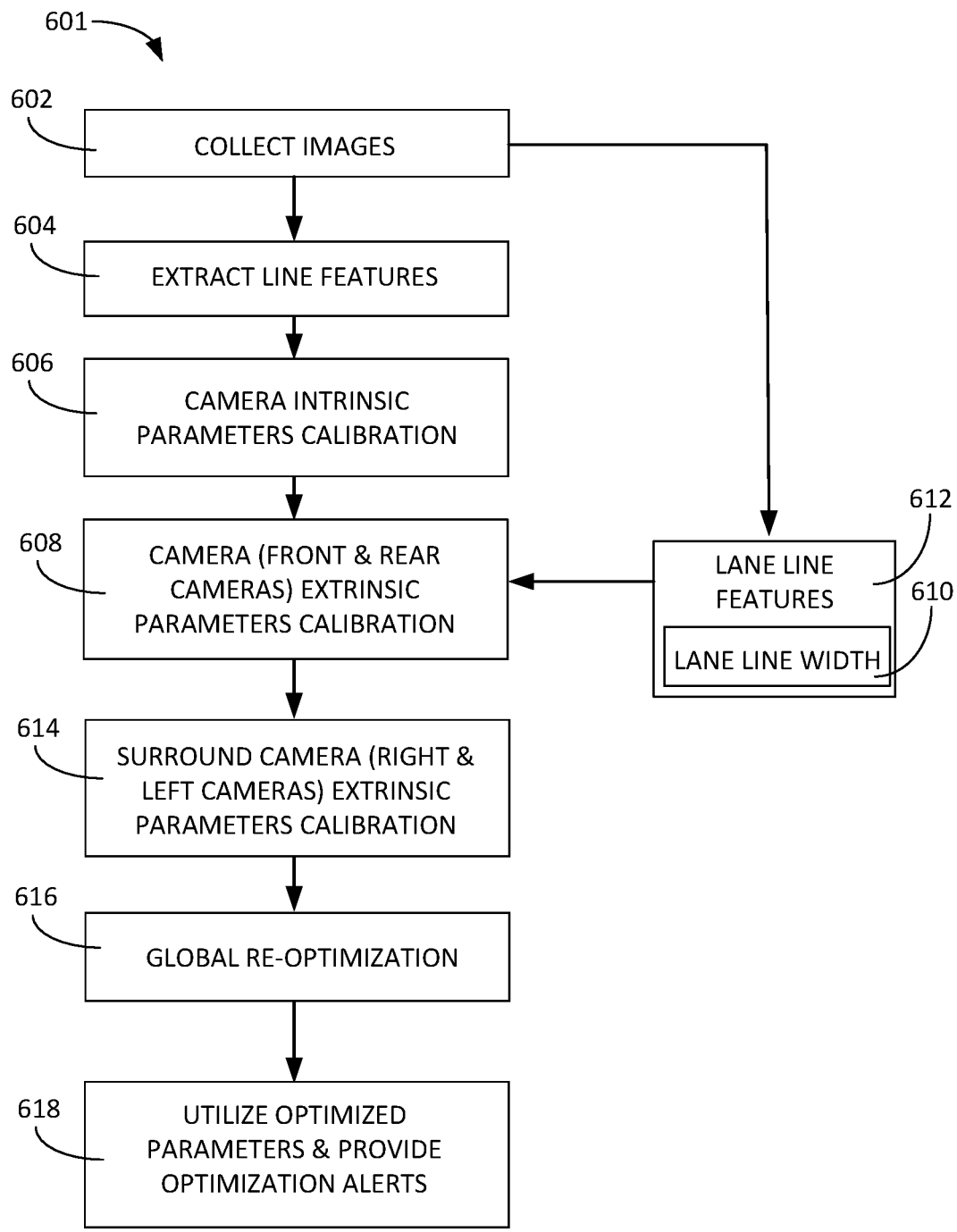
FIG. 6 is exemplary operational flow chart of the navigation system in an embodiment of the present invention.

Referring now to FIG. 6, therein is shown an exemplary operational flow chart 601 of the navigation system 100 of FIG. 1 in an embodiment of the present invention. The exemplary operational flow chart 601 of the navigation system 100 depicts a collect images module 602, in which the parameter extraction unit 112 of FIG. 1 collects the optical data stream 111 of FIG. 1 from the optical sensors 108 for analysis. The collect images module 602 can be operated by the first control circuit 512 in conjunction with the parameter extraction unit 112 and the front optical sensor 220 of FIG. 2, the rear optical sensor 222 of FIG. 2, the left optical sensor 224 of FIG. 2, and the right optical sensor 226 of FIG. 2. The collect images module 602 collect the optical data stream 111 for all of the optical sensors 108.

The collect images module 602 can be coupled to an extract line features module 604. The extract line features module 604 can be operated by the first control circuit 512 of FIG. 5 in conjunction with the parameter extraction unit 112. The extract line features module 604 can utilize machine learning to extract the lane lines 402 of FIG. 4, the horizontal lines 404 of FIG. 4, and the vertical lines 406 of FIG. 4 for analysis.

The extract line features module 604 can be coupled to a camera intrinsic parameters calibration module 606. The camera intrinsic parameters calibration module 606 can be operated by the first control circuit 512 in conjunction with the parameter extraction unit 112. The camera intrinsic parameters calibration module 606 can utilize the horizontal lines 404 and the vertical lines 406 to calculate the intrinsic parameters 420 including focal length, aspect ratio, the principal point 320, and the distortion coefficient 412. Since the focal length and the aspect ratio are fixed at manufacturing, the camera intrinsic parameters calibration module 606 can monitor the principal point 320 and the distortion coefficient 412 as a higher priority. Any rapid deviation from the previous calibrated values can indicate an immanent problem.

The camera intrinsic parameters calibration module 606 can be coupled to a camera extrinsic parameters calibration module 608. The camera extrinsic parameters calibration module 608 can be operated by the first control circuit 512 in conjunction with the parameter extraction unit 112. The lane lines 402 can be used to calibrate the extrinsic parameters 418 of FIG. 4 of the front optical sensor 220 and the rear optical sensor 222. Since the lane lines 402 have the characteristic that they are horizontal in nature and parallel to each other, their geometry can be used to calculate the first set of vanishing points 408 and the second set of vanishing points 410. The vanishing points can be used to calculate the yaw angle and the pitch angle of the camera 304. The roll angle of the camera 304 can be calculated based on the lane line width 610 of the lane lines 402. The lane line width 610 can be the measured width of the painted lane lines 402 provided by a lane line features module 612. The camera extrinsic parameters calibration module 608 can use the lane line width 610 to calculate the roll angle of the camera 304.

The lane line features module 612 can be operated by the first control circuit 512 in conjunction with the parameter extraction unit 112. The lane line features module 612 can determine the lane line width 610 by comparing the pixel count of the lane lines 402 with the pixel count of the space between the lane lines 402.

The camera extrinsic parameters calibration module 608 can be coupled to a surround camera extrinsic parameters calibration module 610. The surround camera extrinsic parameters calibration module 610 can be operated by the first control circuit 512 in conjunction with the global re-optimization unit 114 of FIG. 1. The surround camera extrinsic parameters calibration module 610 can calibrate the extrinsic parameters 418 of the left optical sensor 224 and the right optical sensor 226. Given the knowledge that the lane lines 402 are parallel with each other, the surround camera extrinsic parameters calibration module 610 can align the lane lines 402 observed by the left optical sensor 224 and the right optical sensor 226 with the lane lines 402 calibrated by the front optical sensor 220 and the rear optical sensor 222 previously. The alignment of the lane lines 402 can provide extrinsic parameters 418 for the left optical sensor 224 and the right optical sensor 226.

The surround camera extrinsic parameters calibration module 610 can solve for the left and right extrinsic parameters. It is understood that the position/location information used in the analysis of the intrinsic parameters 420 of FIG. 4 and the extrinsic parameters 418 of FIG. 4 are based on the overhead view 414 of FIG. 4 coordinate system. By way of an example, the surround camera extrinsic parameters calibration module 610 can calculate the left extrinsic parameters 418 by:

$$P_{left} = F(P_{left\_img}, \text{extrinsic}_{left}, \text{intrinsic}_{left}) \qquad \text{EQ (1)}$$

Where $P_{left}$ is the position of the left lane line, $P_{left\_img}$ is the location of the left lane line in the optical data stream 111, extrinsic$_{left}$ is the extrinsic parameters 418 of the left optical sensor 224, intrinsic$_{left}$ is the intrinsic parameters 420 of the left optical sensor 224, $$L_{front} = F(L_{front\_img}, \text{extrinsic}_{front}, \text{intrinsic}_{front}) \qquad \text{EQ (2)}$$

Where $L_{front}$ is the calibrated location of the lane lines as viewed by the front optical sensor 220, $L_{front\_img}$ is the calibrated location of the lane lines as viewed in the optical data stream 1111 of the front optical sensor 220, extrinsic$_{front}$ is the extrinsic parameters 418 of the front optical sensor 220, intrinsic$_{front}$ is the intrinsic parameters 420 of the front optical sensor 220, $$L_{rear} = F(L_{rear\_img}, \text{extrinsic}_{rear}, \text{intrinsic}_{rear}) \qquad \text{EQ (3)}$$

Where $L_{rear}$ is the calibrated location of the lane lines as viewed by the rear optical sensor 222, $L_{rear\_img}$ is the calibrated location of the lane lines as viewed by the rear optical sensor 222, extrinsic$_{rear}$ is the extrinsic parameters 418 of the rear optical sensor 222, intrinsic$_{rear}$ is the intrinsic parameters 420 of the rear optical sensor 222, $$\min = \sum_{i=1}^{N} dis\ (Pleft, Lfront, Lrear) \qquad \text{EQ (4)}$$

Where the minimize function min of the summation from i=1 to N of the distance dis between the position of the left lane line, the calibrated location of the lane lines as viewed by the front optical sensor 220, and the calibrated location of the lane lines as viewed by the rear optical sensor 222.

It is understood that the same equation techniques can be employed on the right optical sensor 226 in order to optimize the extrinsic parameters 418 and intrinsic parameters 420 of the right optical sensor 226.

The surround camera extrinsic parameters calibration module 610 can be coupled to a global re-optimization module 616. The global re-optimization module 616 can be operated by the first control circuit 512 in conjunction with the global re-optimization unit 114 in order to assign the real world location, such as a GPS location, of the lines and features in the optical data stream for each of the front optical sensor 220, the rear optical sensor 222, the left optical sensor 224, and the right optical sensor 226. The first control circuit 512 can further utilize the overhead view unit 116 to fuse the images from the front optical sensor 220, the rear optical sensor 222, the left optical sensor 224, and the right optical sensor 226 into the overhead view 414 of FIG. 4. The overhead view 414 can be displayed on the user interface 212 of FIG. 2 having the view center 415 of FIG. 4 at the geolocation of the first device 102. The relative position of the front optical sensor 220, the rear optical sensor 222, the left optical sensor 224, and the right optical sensor 226 to the view center 415 can be determined during the manufacture of the first device 102 in order to provide an absolute location of the overhead view 414.

The global re-optimization module 616 can be coupled to a utilize optimized parameters module 618. The utilize optimized parameters module 618 can be operated by the first control circuit 512. When the calibration of intrinsic parameters 420 and extrinsic parameters 418 of the front optical sensor 220, the rear optical sensor 222, the left optical sensor 224, and the right optical sensor 226 is complete, the optimized parameters 120 can be utilized to generate the overhead view 414 and the optimized parameters 120 can be transferred to the second device 105 of FIG. 1 for analysis. The second device 106 can determine trends in the parameters and set thresholds for warnings of maintenance required and manual intervention required. If the second device 106 receives the optimized parameters 120 that are below the threshold for safe operation of the first device 102, the optical sensor alert 416 can be sent to the first device 102 for display on the user interface 212.

It has been discovered that calibration the optimized parameters 120 can maintain the safe operation of the first device 102, If the optimized parameters 120 fail to meet the safety threshold provided by the second device 106, the user 118 can be alerted by displaying the optical sensor alert 416 on the user interface 212. The optical sensor alert 416 can indicate that maintenance is required, but the vehicle can proceed or manual intervention is required because the first device 102 is unsafe to operate in the autonomous mode.

Figure 7:
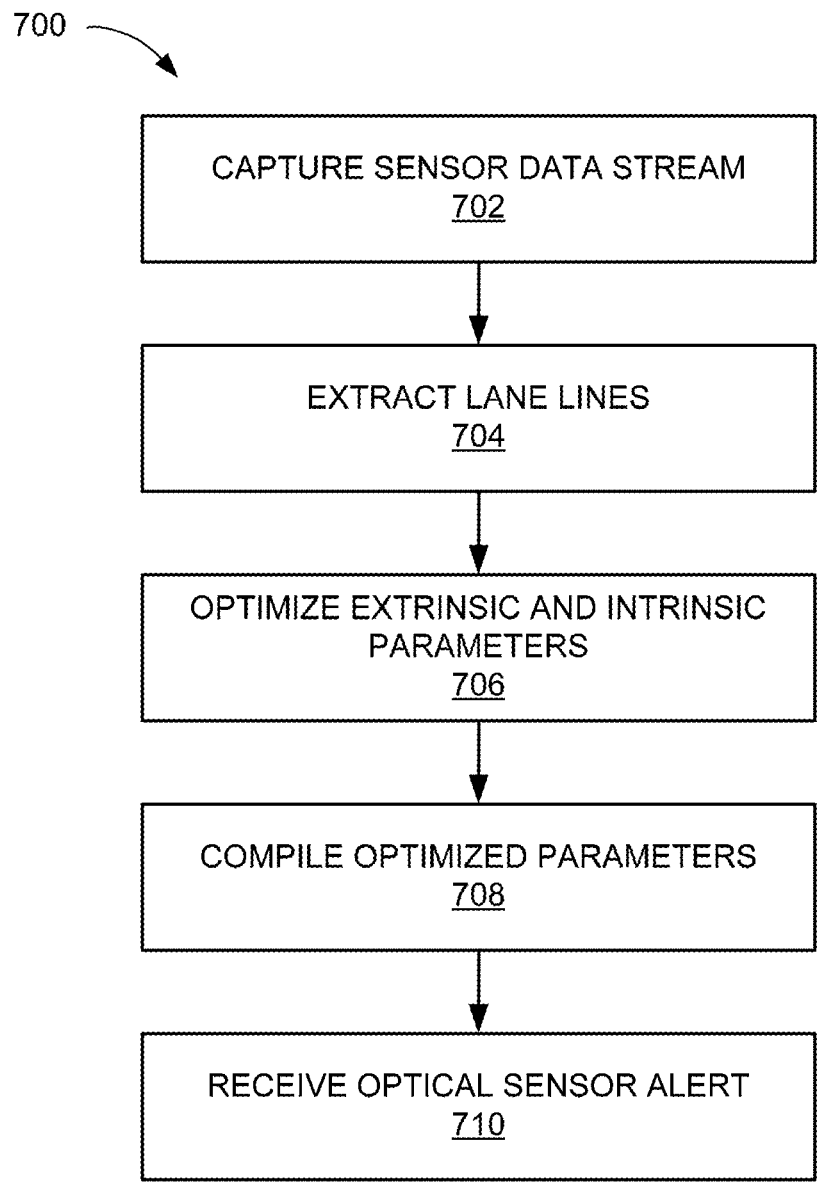
FIG. 7 is a flow chart of a method of operation of a navigation system in an embodiment of the present invention.

Referring now to FIG. 7, therein is shown a flow chart of a method 700 of operation of a navigation system 100 of FIG. 1 in an embodiment of the present invention. The method 700 includes: capturing a sensor data stream provided by optical sensors in a block 702: extracting lane lines from the sensor data stream in a block 704: optimizing an intrinsic parameter and an extrinsic parameter based on the extract of the lane lines in a block 706: compiling optimized parameters including the intrinsic parameter and the extrinsic parameter in a block 708: and receiving an optical sensor alert through the network for displaying on a device in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a control circuit configured to:
capture a sensor data stream provided by optical sensors,
extract lane lines, a horizontal line, and a vertical line from the sensor data stream,
determine a distortion coefficient of the sensor data stream from a principal point, the lane lines, a first set of vanishing points of the horizontal line, and a second set of vanishing points of the vertical line, wherein the principal point is located at an intersection of the horizontal line connecting the first set of vanishing points and the vertical line connecting the second set of vanishing points,
optimize an extrinsic parameter and an intrinsic parameter based on the extract of the lane lines and the distortion coefficient, and
compile optimized parameters including the extrinsic parameter and the intrinsic parameter; and
a communication circuit, coupled to the control circuit, configured to receive an optical sensor alert, when the optimized parameters are below a threshold, for displaying on a device.

2. The system as claimed in claim 1 wherein the control circuit is configured to calculate the distortion coefficient includes the control circuit is configured to:
determine the principal point for an image plane;
calculate a distance between the principal point and the lane lines; and
monitor a curvature of the lane lines by correcting the alignment of lane line ends, in an overhead view, of images from the front optical sensor and left optical sensor.

3. The system as claimed in claim 1 wherein the control circuit is configured to calculate the distortion coefficient based on the extracting the lane lines, the horizontal lines, and the vertical lines from the sensor data stream.

4. The system as claimed in claim 1 wherein the control circuit is configured to generate the first set of vanishing points and the second set of vanishing points to calculate the distortion coefficient.

5. The system as claimed in claim 1 wherein the control circuit is configured to execute a global re-optimization module including generating an overhead view.

6. The system as claimed in claim 1 wherein the control circuit is configured to generate an overhead view by combining the sensor data stream from a front optical sensor, a rear optical sensor, a left optical sensor, and a right optical sensor and correcting the overlap regions.

7. The system as claimed in claim 1 wherein the control circuit is configured to calculate the extrinsic parameter of a front optical sensor and a rear optical sensor based on a lane line width.

8. A method of operation for a navigation system comprising:
capturing a sensor data stream provided by optical sensors;
extracting lane lines, a horizontal line, and a vertical line from the sensor data stream;
determining a distortion coefficient of the sensor data stream from a principal point, the lane lines, a first set of vanishing points of the horizontal line, and a second set of vanishing points of the vertical line, wherein the principal point is located at an intersection of the horizontal line connecting the first set of vanishing points and the vertical line connecting the second set of vanishing points;
optimizing an extrinsic parameter and an intrinsic parameter based on the extract of the lane lines and the distortion coefficient;
compiling optimized parameters including the extrinsic parameter and the intrinsic parameter; and
receiving an optical sensor alert, when the optimized parameters are below a threshold, for displaying on a device.

9. The method as claimed in claim 8 further comprising calculating the distortion coefficient by determining the principal point for an image plane and calculating a distance between the principal point and the lane lines includes monitoring a curvature of the lane lines by correcting the alignment of lane line ends, in an overhead view, of images from the front optical sensor and left optical sensor.

10. The method as claimed in claim 8 further comprising calculating the distortion coefficient by extracting the lane lines, the horizontal lines, and the vertical lines from the sensor data stream.

11. The method as claimed in claim 8 further comprising generating the first set of vanishing points and the second set of vanishing points to calculate the distortion coefficient.

12. The method as claimed in claim 8 further comprising executing a global re-optimization module including generating an overhead view.

13. The method as claimed in claim 8 further comprising generating an overhead view by combining the sensor data stream from a front optical sensor, a rear optical sensor, a left optical sensor, and a right optical sensor and correcting the overlap regions.

14. The method as claimed in claim 8 further comprising calculating the extrinsic parameter of a front optical sensor and a rear optical sensor based on a lane line width.

15. A non-transitory computer readable medium including instructions for a navigation system comprising:
   capturing a sensor data stream provided by optical sensors;
   extracting lane lines, a horizontal line, and a vertical line from the sensor data stream;
   determining a distortion coefficient of the sensor data stream from a principal point, the lane lines, a first set of vanishing points of the horizontal line, and a second set of vanishing points of the vertical line, wherein the principal point is located at an intersection of the horizontal line connecting the first set of vanishing points and the vertical line connecting the second set of vanishing points;
   optimizing an extrinsic parameter and an intrinsic parameter based on the extract of the lane lines and the distortion coefficient;
   compiling optimized parameters including the extrinsic parameter and the intrinsic parameter; and
   receiving an optical sensor alert, when the optimized parameters are below a threshold, for displaying on a device.

16. The non-transitory computer readable medium including the instructions as claimed in claim 15 further comprising calculating the distortion coefficient by determining the principal point for an image plane and calculating a distance between the principal point and the lane lines includes monitoring a curvature of the lane lines by correcting the alignment of lane line ends, in an overhead view, of images from the front optical sensor and left optical sensor.

17. The non-transitory computer readable medium including the instructions as claimed in claim 15 further comprising calculating the distortion coefficient by extracting the lane lines, the horizontal lines, and the vertical lines from the sensor data stream.

18. The non-transitory computer readable medium including the instructions as claimed in claim 15 further comprising executing a global re-optimization module including generating an overhead view.

19. The non-transitory computer readable medium including the instructions as claimed in claim 15 further comprising generating an overhead view by combining the sensor data stream from a front optical sensor, a rear optical sensor, a left optical sensor, and a right optical sensor and correcting the overlap regions.

20. The non-transitory computer readable medium including the instructions as claimed in claim 15 further comprising calculating the extrinsic parameter of a front optical sensor and a rear optical sensor based on a lane line width.

* * * * *